(12) United States Patent
Chen

(10) Patent No.: US 9,130,385 B2
(45) Date of Patent: *Sep. 8, 2015

(54) TABLET STORAGE AND CHARGING CART

(75) Inventor: Feng-Ming Chen, Taoyuan County (TW)

(73) Assignee: CHEN-SOURCE INC., Guishan Township, Taoyuan County (TW)

(*) Notice: Subject to any disclaimer, the term of this patent is extended or adjusted under 35 U.S.C. 154(b) by 672 days.

This patent is subject to a terminal disclaimer.

(21) Appl. No.: 13/348,235

(22) Filed: Jan. 11, 2012

(65) Prior Publication Data

US 2013/0175993 A1    Jul. 11, 2013

(51) Int. Cl.
*H02J 7/00* (2006.01)

(52) U.S. Cl.
CPC ............. H02J 7/0044 (2013.01); H02J 7/0027 (2013.01); *H02J 2007/0062* (2013.01)

(58) Field of Classification Search
USPC .................................................. 320/107, 114
See application file for complete search history.

(56) References Cited

U.S. PATENT DOCUMENTS

| | | | |
|---|---|---|---|
| 4,413,219 A * | 11/1983 | Ducharme et al. | 320/109 |
| 7,978,463 B1 * | 7/2011 | Haun et al. | 361/679.01 |
| 2004/0070929 A1 * | 4/2004 | Lin | 361/685 |
| 2005/0110461 A1 * | 5/2005 | McConnell et al. | 320/116 |
| 2009/0096336 A1 * | 4/2009 | Petrick et al. | 312/237 |
| 2009/0112099 A1 * | 4/2009 | Kurokawa | 600/459 |
| 2011/0193524 A1 * | 8/2011 | Hazzard et al. | 320/114 |

* cited by examiner

*Primary Examiner* — Samuel Berhanu
(74) *Attorney, Agent, or Firm* — Muncy, Geissler, Olds & Lowe, P.C.

(57) ABSTRACT

A tablet storage and charging cart includes a mobile cabinet formed of a horizontal base frame, two opposing upright frames and one or a number of horizontal partition panels and defining therein a plurality of storage compartments, a plurality of tablet racks set in the storage compartments for holding tablet PCs individually, and a transmission control system, which includes a power management device electrically connectable to an external power source for power input and one or a number of connector modules electrically coupled with the power management device, each connector module having multiple USB sockets and multiple transmission cables respectively electrically connected to the USB sockets and adapted for electrically connecting the USB sockets to storage tablet PCs.

12 Claims, 10 Drawing Sheets

TABLET STORAGE AND CHARGING CART

BACKGROUND OF THE INVENTION

1. Field of the Invention:

The present invention relates to a cart for storing and charging tablet PCs and more particularly, to a tablet storage and charging cart, which uses tablet racks for storing tablet PCs in lines at different elevations in a mobile cabinet, and a transmission control system consisting of a power management device and a number of connector modules for charging storage tablet PCs and updating software programs in the storage tablet PCs synchronously.

2. Description of the Related Art:

Following fast development of electronic and multimedia technologies, modern mobile electronic devices, such as notebook computer, tablet PC, intelligent mobile phone, PDA and etc., commonly have light, thin, short, small and high power characteristics. In consequence, advanced software has been continuously developed to enhance the functioning of hardware. A combination of software and hardware allows computers to exchange data and to share software and devices.

To satisfy the requirement for the characteristics of being light, thin, short and thin, the internal component design of a notebook computer must be highly accurate and precise. Thus, it is important to provide a notebook computer carrying tool that effectively protects the storage notebook computer against impact and damage. Many notebook protective cases are commercially available. A notebook protective case is known comprising a top cover and bottom shell. The bottom shell defines therein a recessed accommodation chamber for accommodating a notebook computer, and a rack mounted in the accommodation chamber and biasable toward the inside or outside of the accommodation chamber. This design of notebook protective case is functional; however, it simply can accommodate one single notebook computer. A school, organization or big company may need to prepare a big number of notebook computers for the purpose of information classification or different software applications. After each use of multiple notebook computers in a classroom, the notebook computers may be directly kept on the desks in the classroom. It is inconvenient to manage these notebook computers in this manner. Further, these notebook computers may be stolen by a theft easily.

Further, keeping a notebook computer in a notebook protective case facilitates carrying. However, a conventional notebook protective case cannot charge the storage notebook computer. To avoid a power supply problem, the battery power of a notebook computer must be checked or fully charged by an external power source before carrying in a notebook protective case. Further, when going to update an educational software program or any other software program in the notebook computer, the user must take the notebook computer out of the notebook protective case and start up the notebook computer and then connect the notebook computer to the host computer or server system directly or through the Internet. When going to update a big number of notebook computers, it will take a lot of time. Further, it is inconvenient to arrange the transmission cables of multiple notebook computers.

Therefore, it is desirable to provide a measure that eliminates the aforesaid problems.

SUMMARY OF THE INVENTION

The present invention has been accomplished under the circumstances in view. It is the main object of the present invention to provide a tablet storage and charging cart, which comprises a mobile cabinet defining therein multiple storage compartments at different elevations, a plurality of storage boxed respectively set in the storage compartments, a plurality of tablet racks set in the storage boxes for holding tablet computers individually, and a transmission control system, which comprises a power management device mounted at the mobile cabinet and electrically connectable to an external power source for power input and one or a number of connector modules with multiple USB sockets and multiple transmission cables for electrically connecting storage tablet computers to the power management device for charging and signal transmission, facilitating tablet computer management and synchronous charging and real time updating.

Further, each tablet rack comprises two symmetrical rack panels, a plurality of hinges joining the two rack panels, and a plurality of retaining spring plates located on an inside wall of each rack panel for holding down one storage tablet computer therein to protect the storage tablet computer against impact and damage.

The transmission control system further comprises an expansion connector module electrically connected to the power management device and the connector modules. The expansion connector module comprises a plurality of electrical signal connectors and a plurality of power sockets for the connection of external electronic devices to communicate with the storage tablet computers for supplying power supply and transmitting data signal for downloading or updating educational software programs, multimedia teaching materials or any other software programs remotely and synchronously over the web.

DETAILED DESCRIPTION OF THE PREFERRED EMBODIMENT

Figure 1:
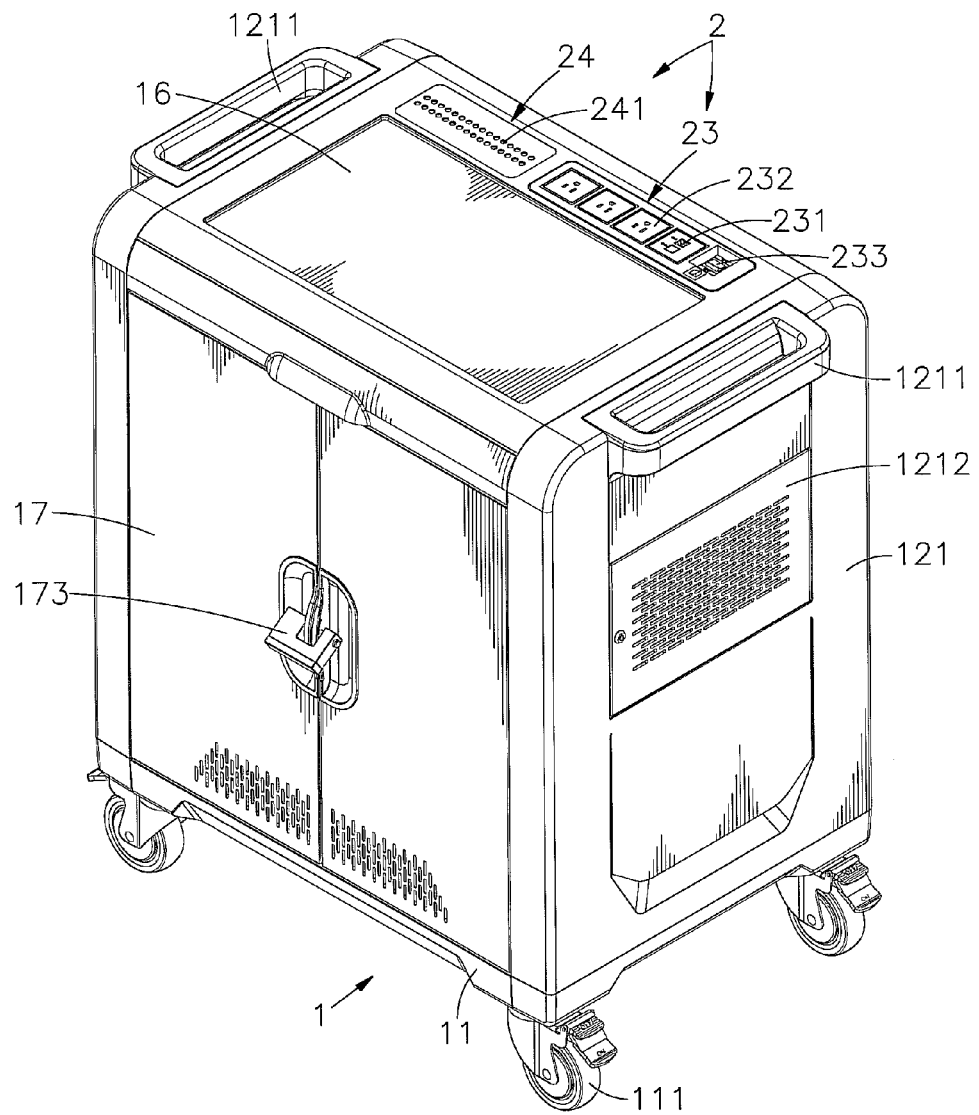
FIG. 1 is an elevational view of a tablet storage and charging cart in accordance with the present invention.

Referring to FIGS. 1, 2, 3, 4 and 5, a tablet storage and charging cart in accordance with the present invention is shown. The tablet storage and charging cart comprises a mobile cabinet 1 and a transmission control system 2.

The mobile cabinet 1 comprises a horizontal base frame 11, two opposing upright frames 12 upwardly extended from the horizontal base frame 11, a plurality of horizontal partition panels 13 respectively formed of a respective sliding pan 131 and inserted in between the two upright frames 12 at different elevations, a back plate 14 attached to the back side of each horizontal partition panel 13 and defining with the respective horizontal partition panel 13 a respective storage compartment 10, a storage box 15 located within each storage compartment 10, an accommodation space 101 defined in a back side relative to the back plates 14 and opposite to the storage boxes 15, a top cover 16 located on the top side of the upright frames 12, a tray 161 slidably inserted in between the top cover 16 and the upright frames 12, a plurality of front door panels 17 bilaterally coupled to one upright frame 12 and biasable relative to the respective upright frame 12 within 90-degrees angle between a close position and an open position, and a plurality of rear door panels 18 respectively hinged to the other upright frame 12.

The transmission control system 2 comprises a power management device 21, and a plurality of connector module 22 electrically coupled with the power management device 21 by a respective flexible circuit board or flexible flat cable 211. Each connector module 22 comprises a plurality of USB sockets 221 and a plurality of transmission cables 222 respectively electrically connected to the USB sockets 221. The USB sockets 221 can be USB Type A sockets for conducting electric current to provide power supply and transmit data signal.

The transmission control system 2 further comprises an expansion connector module 23 and a display unit 24 electrically connected to the power management device 21 and the connector modules 22 by cables (not shown). The expansion connector module 23 comprises a plurality of electrical signal connectors 231, a plurality of power sockets 232 and a switch 233. The electrical signal connectors 231 can be USB Type B sockets, RJ45 connectors, audio connectors, or signal input/output connectors.

During installation, the power management device 21 of the transmission control system 2 is mounted in the accommodation space 101 inside the mobile cabinet 1; the connector modules 22 are respectively affixed to the respective front walls of the back plates 14; the transmission cables 222 are respectively inserted through the back plates 14 with the plugs 2221 at respective one ends of the transmission cables 222 respectively inserted into the USB sockets 221 and the plugs 2221 at respective opposite ends of the transmission cables 222 suspending behind the respective back plates 14. Further, cable brackets 141 are arranged in a line at each of the back plates 14 for securing the transmission cables 222 in a good order.

Further, a power socket 181 is mounted at one back door panel 18 and electrically coupled with the power management device 21 of the transmission control system 2; a power switch 182 is mounted at the same back door panel 18 for switching on/off the power socket 181. A power cable 3 is provided for electrically connecting the power socket 181 to an external power source 4, for example, city power supply. Thus, AC power supply can be inputted from the external power source 4 through the power cable 3 into the power socket 181 and then the transmission control system 2, and converted by the transmission control system 2 into different DC voltages for output. Further, cable brackets 183 are located on the same back door panel 18 for securing the power cable 3 in a received condition to prevent stumbling accidents.

Further, casters 111 are mounted to the bottom wall of the horizontal base frame 11 of the mobile cabinet 1, facilitating movement of the mobile cabinet 1. Two side covers 121 are mounted to the upright frames 12 at two opposite lateral sides, and respectively equipped with a respective handle 1211. Further, a fan module 122 is mounted at each side cover 12 and electrically coupled with the power management device 21 of the transmission control system 2 for causing currents of air to carry waste heat away from the internal space of the mobile cabinet 1. The fan module 122 at each side cover 12 is covered by a fan grill 1212. The fan grill 1212 is openable, facilitating the maintenance and cleaning of the associating fan module 122.

Figure 9:
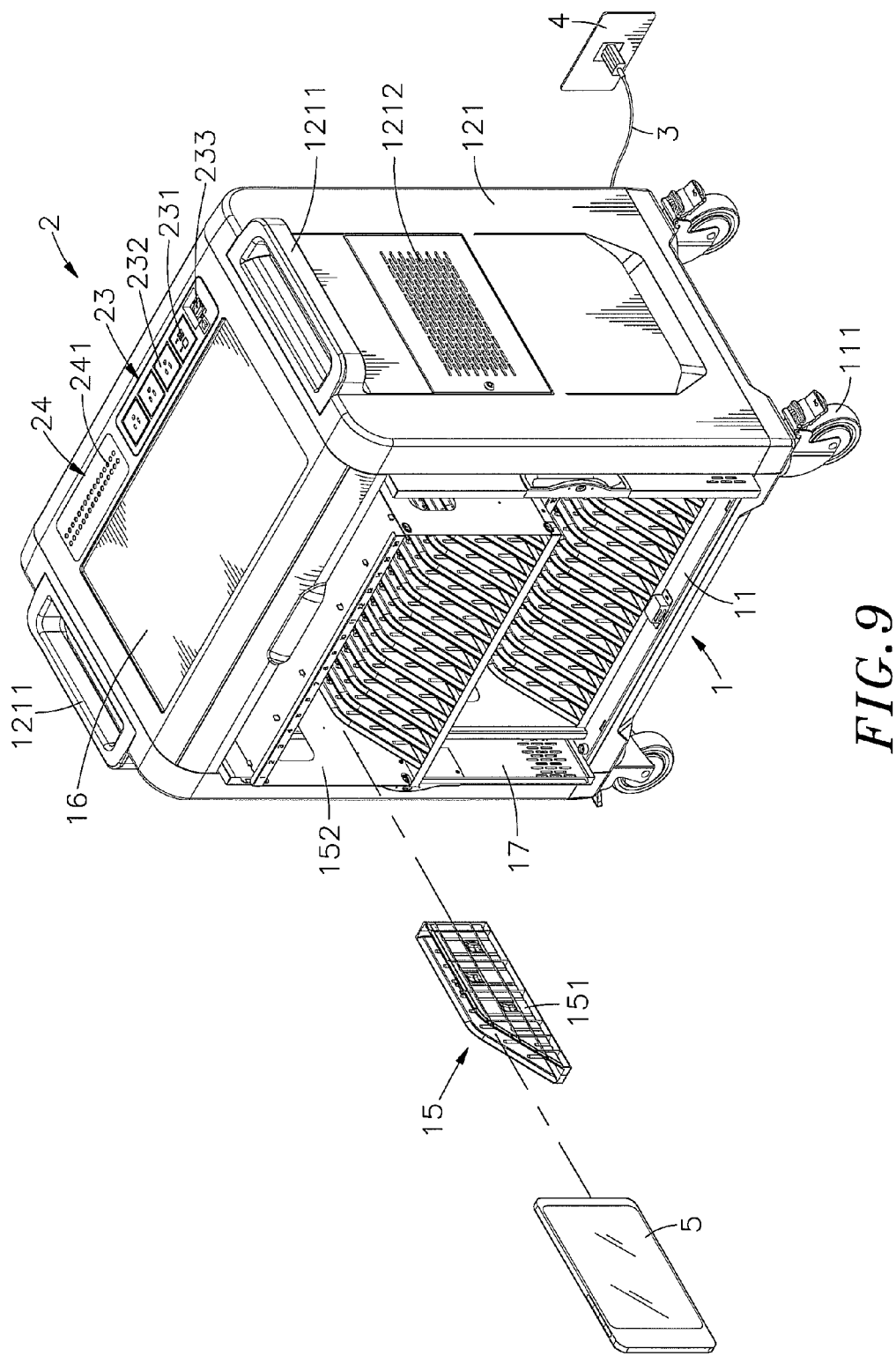
FIG. 9 is an exploded view of an application example of the tablet storage and charging cart in accordance with the present invention.

Further, sliding rails 132, 162 are respectively fixedly mounted at the two opposite lateral sides of the sliding pan 131 of each of horizontal partition panels 13 and the two opposite lateral sides of the tray 161, facilitating sliding movement of the horizontal partition panels 13 and the tray 161 in and out of the mobile cabinet 1. Further, guide rails 172 are symmetrically and fixedly mounted in two opposite lateral sliding spaces 120 within the upright frames 12 of the mobile cabinet 1 at different elevations, each having a coupling end portion 171 respectively coupled to the front door panels 17 in such a manner that when the front door panels 17 are biased relative to the upright frames 12 through 90-degrees angle from the close position to the open position, the front door panels 17 can be moved along the guide rails 172 toward the inside of the mobile cabinet 1 and respectively received in the lateral sliding spaces 120 inside the mobile cabinet 1 (see FIGS. 2, 3 and 9).

Referring to FIGS. 6, 7, 8, 9 and 10, each storage box 15 comprises a box body 152 and a plurality of individual tablet racks 150 arranged in the box body 152. The box body 152 comprises two hand-holding holes 1522 respectively cut through the two opposite lateral sidewalls thereof, and a plurality of locating grooves 1521 located on the inside wall thereof. Each individual tablet rack 150 comprises two symmetrical rack panels 151, a plurality of hinges 1512 joining the two rack panels 151, a plurality of retaining spring plates 1511 located on the inside wall of each of the rack panels 151, a plurality of male fastening elements, for example, tenones 1513 located on one rack panel 151, and a plurality of female fastening elements, for example, mortises 1514 located on the other rack panel 151 for receiving the tenones 1513. When multiple individual tablet racks 150 are arranged in the box body 152, the externally protruded parts of the hinges 1512 are respectively set in the locating grooves 1521 of the box body 152.

Figure 2:
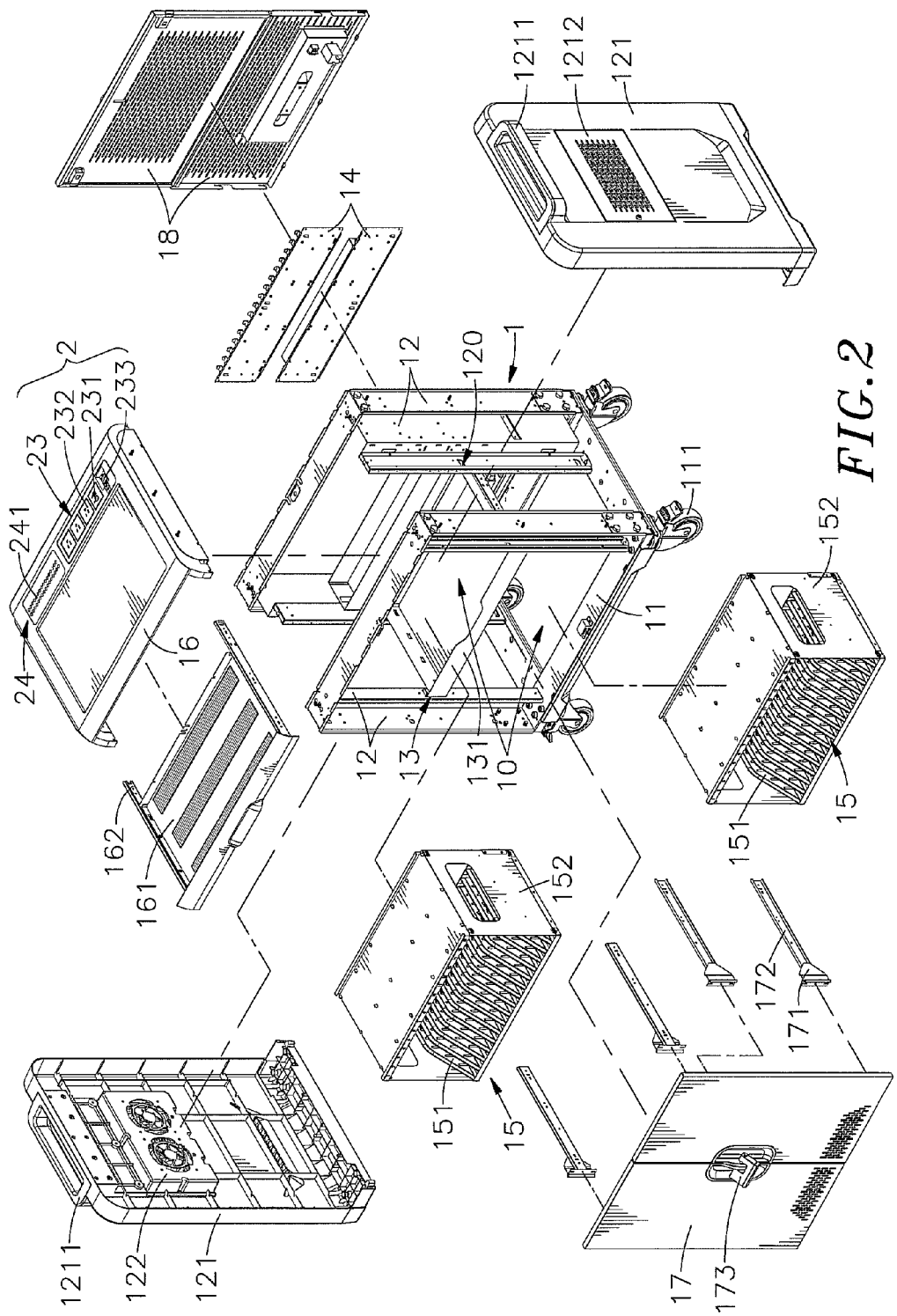
FIG. 2 is an exploded view of the tablet storage and charging cart in accordance with the present invention.
Figure 3:
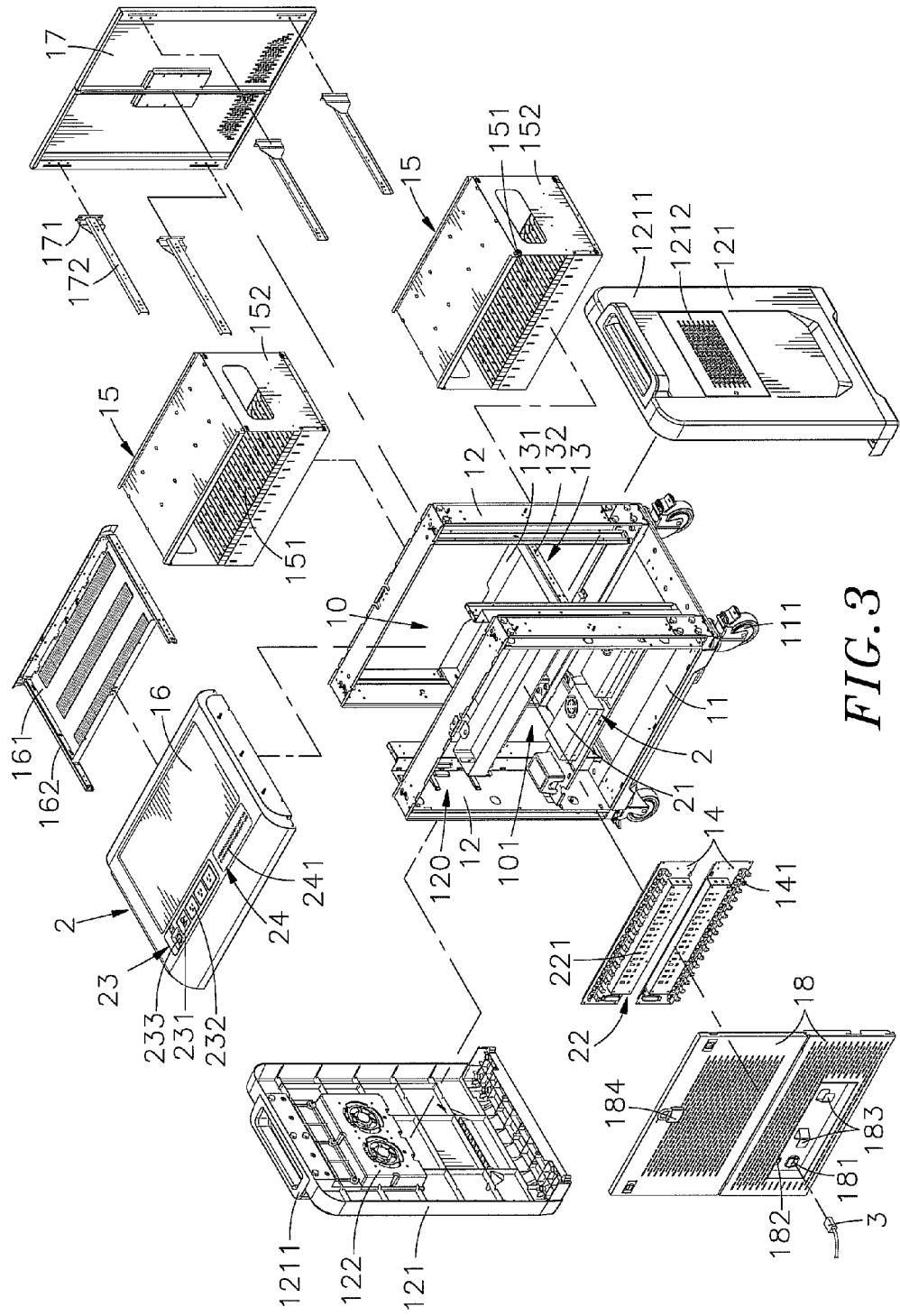
FIG. 3 corresponds to FIG. 2 when viewed from another angle.
Figure 4:
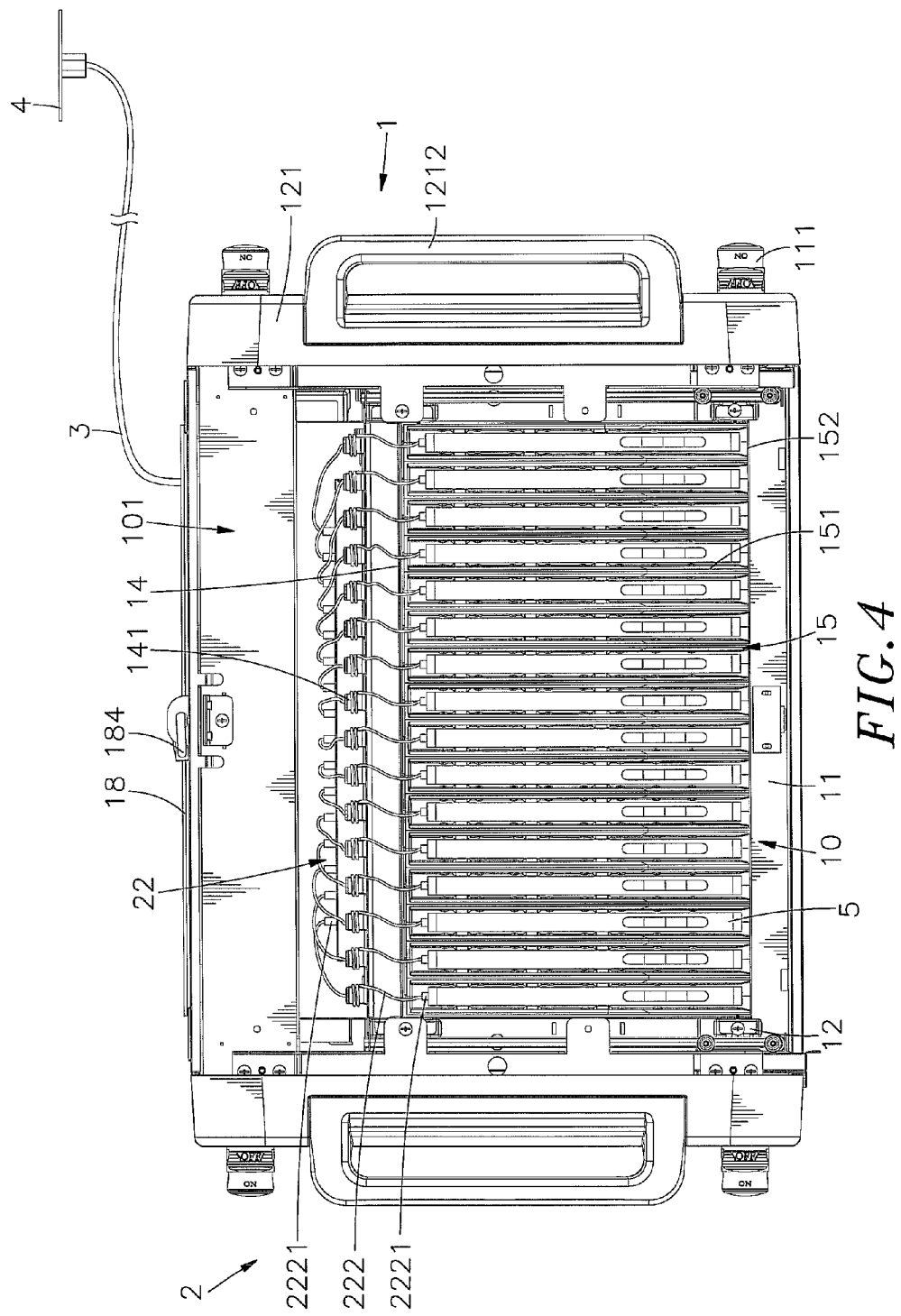
FIG. 4 is a top view of the tablet storage and charging cart in accordance with the present invention.
Figure 5:
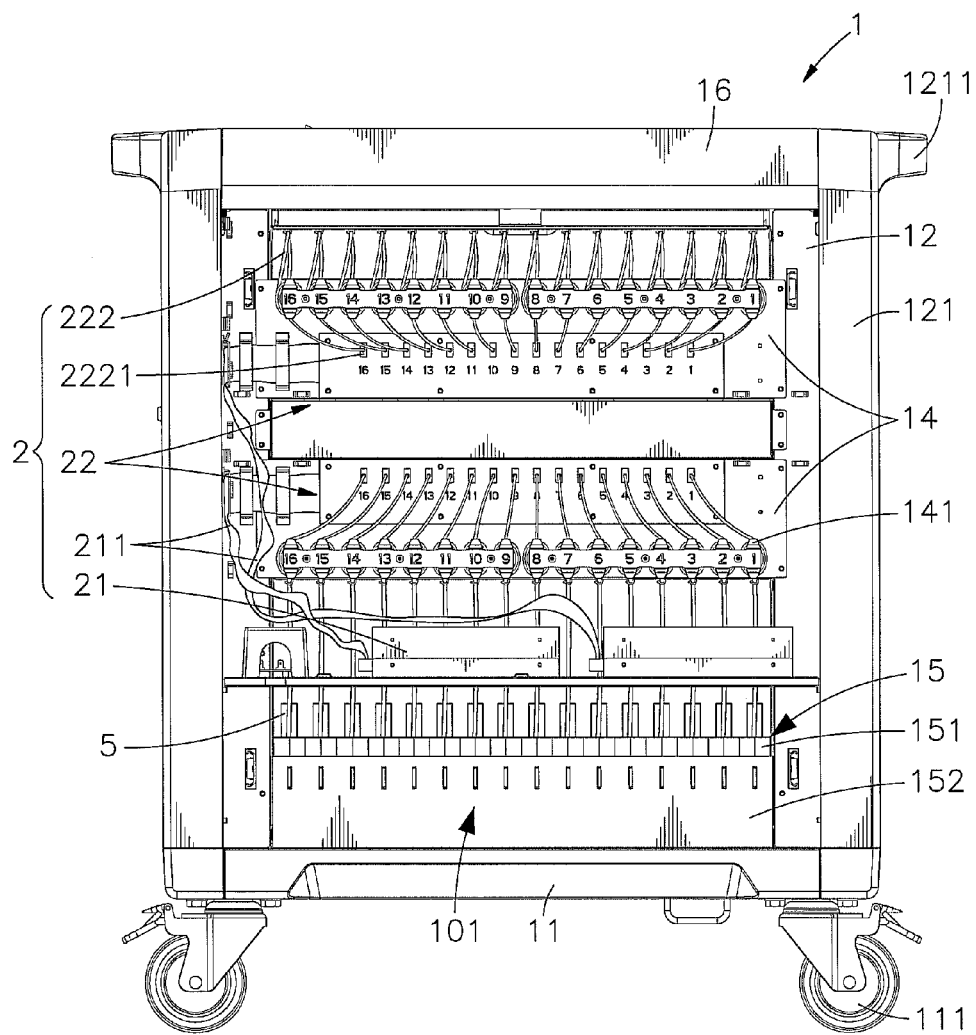
FIG. 5 is a rear side view of the tablet storage and charging cart in accordance with the present invention.
Figure 6:
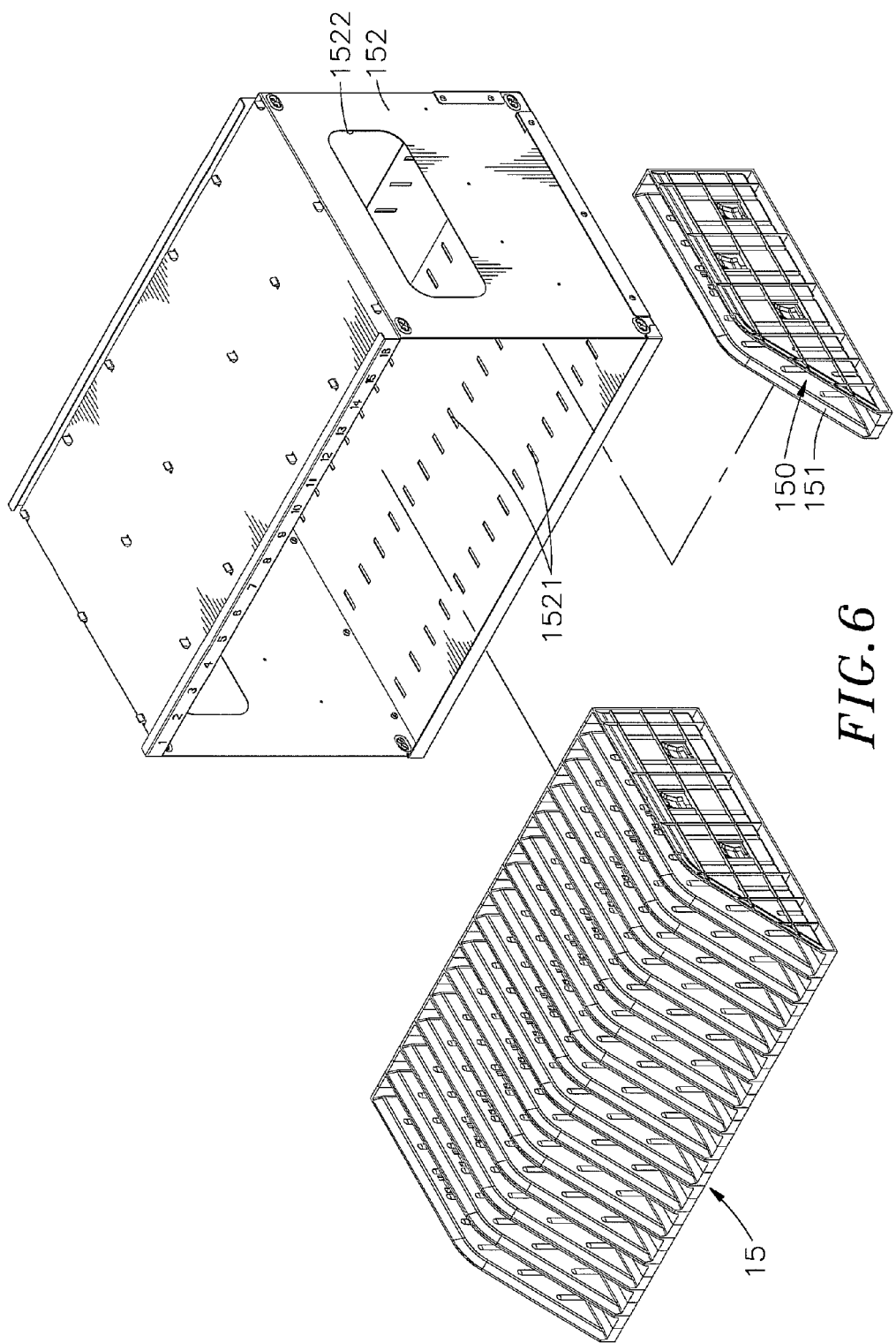
FIG. 6 is an exploded view of one storage box for tablet storage and charging cart in accordance with the present invention.
Figure 7:
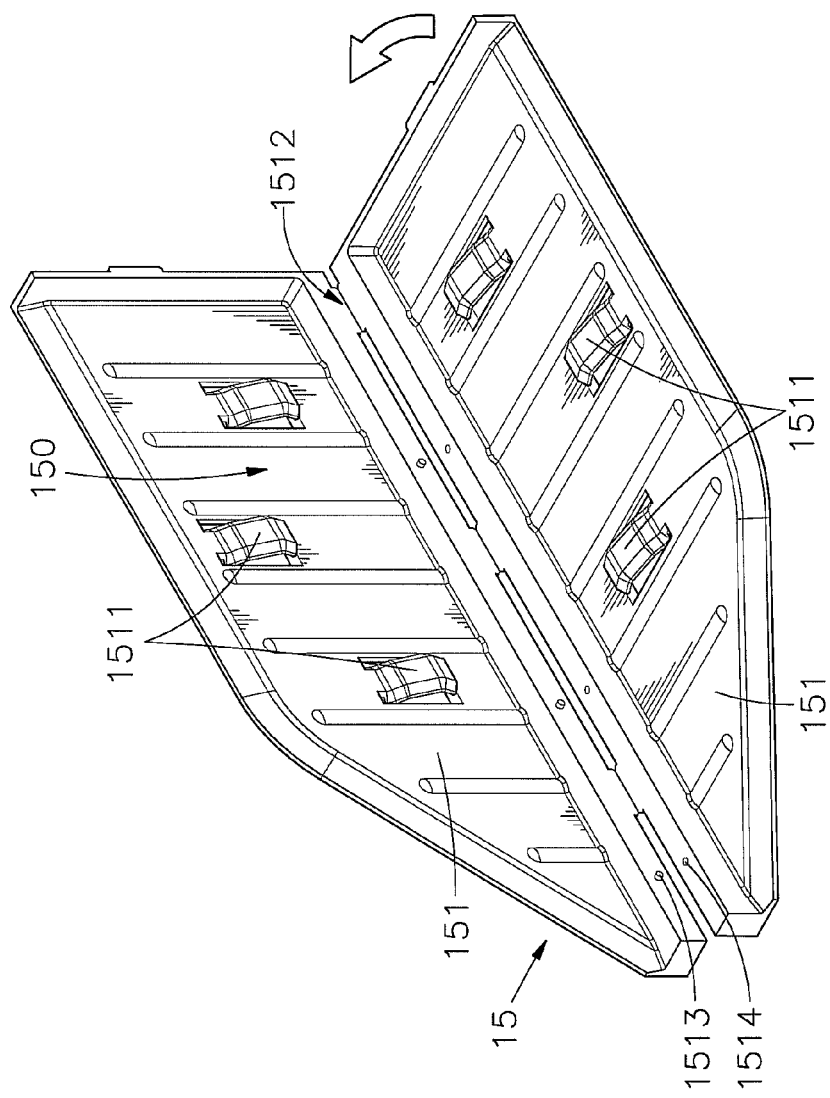
FIG. 7 is an opened view of one individual tablet rack for tablet storage and charging cart in accordance with the present invention.
Figure 8:
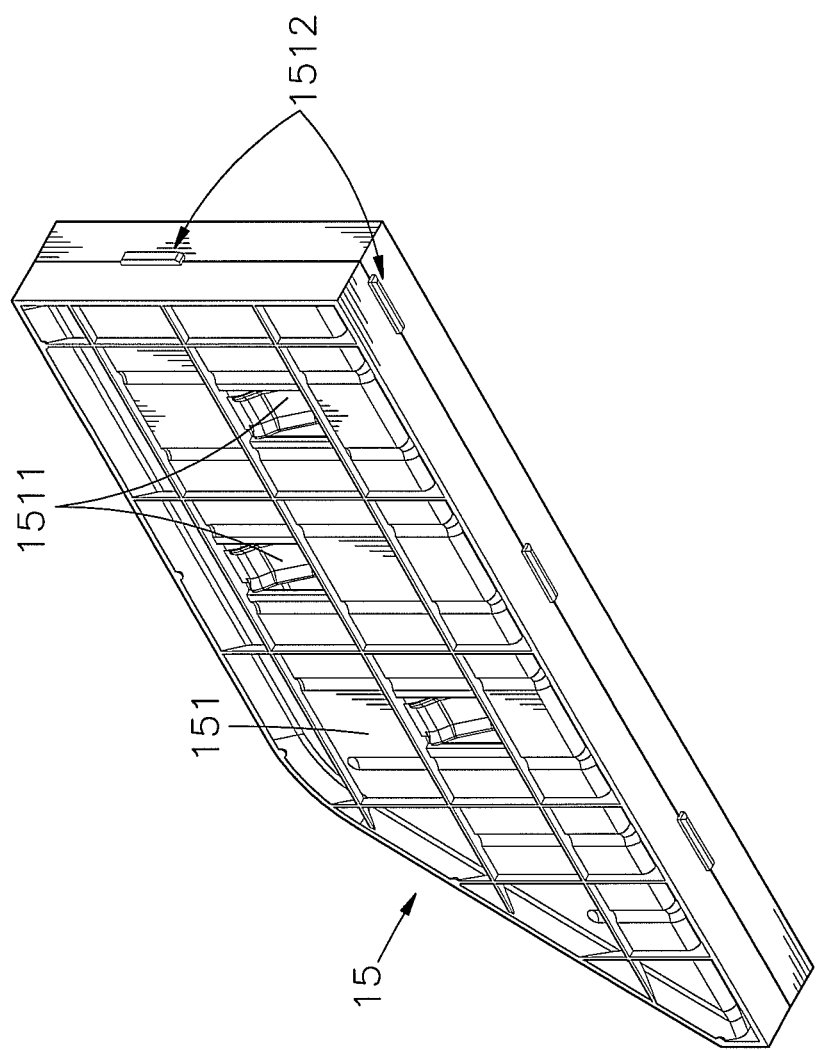
FIG. 8 illustrates the external structure of the individual tablet rack for tablet storage and charging cart in accordance with the present invention.

Further, door locks 173 and 184 are provided for locking the front door panels 17 and the rear door panels 18 (see FIGS. 2 and 3). When the door locks 173 and 184 are unlocked and the front door panels 17 and the rear door panels 18 are opened, the individual tablet racks 150 can be respectively taken out of the box body 152 of each storage box 15 for holding one respective tablet PC 5. After insertion of one tablet PC 5 into the space in between the two rack panels 151 of one individual tablet rack 150, the retaining spring plates 1511 of the respective individual tablet rack 150 are respectively stopped against two opposite lateral sides of the storage tablet PC 5, holding the storage tablet PC 5 firmly and vertically in position and protecting the storage tablet PC 5 against shocks. After storage of one tablet PCs 5 in one individual tablet rack 150, the plug 2221 at respective opposite end of one respective transmission cable 222 of the transmission control system 2 is connected to the mating port at the storage tablet PC 5, and then the individual tablet rack 150 with the storage tablet PC 5 are put in the respective storage box 15 in the mobile cabinet 1. Thus, multiple tablet PCs 5 can be individually stored in the individual tablet racks 150 inside the storage boxes 15 within the mobile cabinet 1 in a good order. Thereafter, close the front door panels 17 and the rear door panels 18, and then lock the door locks 173 and 184, protecting storage tablet PCs 5 from theft and damage.

After the storage of tablet PCs 5 in the mobile cabinet 1, the user can control the power management device 21 of the transmission control system 2 to charge the storage tablet PCs 5 by means of the transmission cables 222 of the connector module 22. When charging the storage tablet PCs 5, light-emitting devices 241 of the display unit 24 are driven to give a visual signal, indicating the charging status of the respective storage tablet PCs 5. The light-emitting devices 241 can be full color LEDs, or high brightness LEDs of different colors. By means of giving off different colors of light and/or flashing modes, the light-emitting devices 241 indicate connection and charging saturation status of the respective storage tablet PCs 5. After completion of charging, the power management device 21 of the transmission control system 2 controls the connector module 22 to cut off power supply from the respective transmission cables 222. If the power management device 21 is started up again, it will start charging subject to predetermined charge settings.

Figure 10:
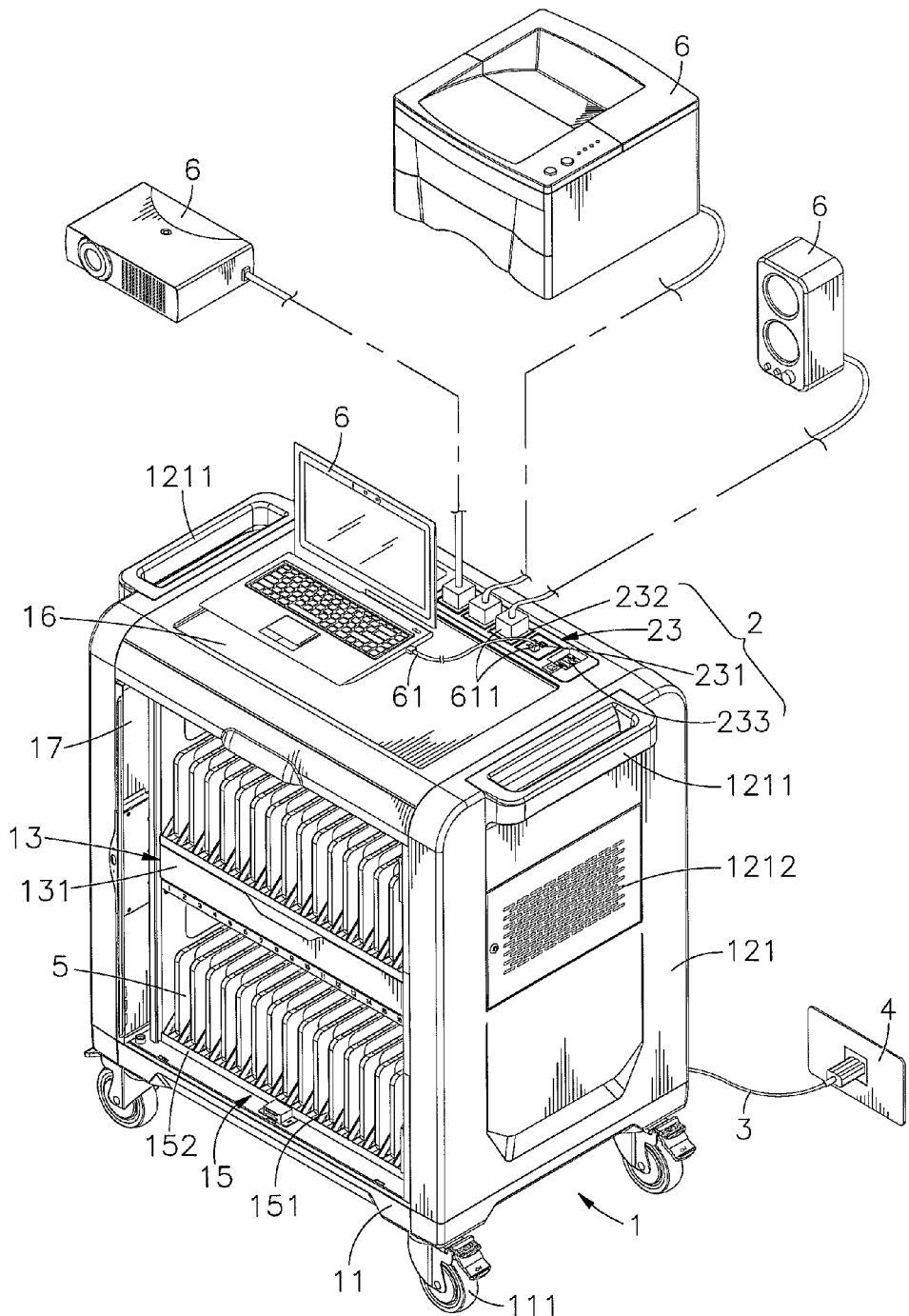
FIG. 10 is a schematic drawing of the present invention, illustrating another application example of the tablet storage and charging cart.

The arrangement of the expansion connector module 23 and display unit 24 of the transmission control system 2 at the top cover 16 is simply an example of the present invention. In actual practice, the expansion connector module 23 and the display unit 24 can be installed in the outside wall of the mobile cabinet 1 at any desired locations. Further, as shown in FIG. 10, electrical plugs 611 of transmission cables 61 of external electronic devices 6 can be connected to the electrical signal connectors 231 or power sockets 232 of the expansion connector module 23 to obtain different necessary working voltages from the transmission control system 2 of the tablet storage and charging cart and to communicate with the storage tablet PCs 5. These external electronic devices 6 can be network connection devices (router, hub), signal transmitter and receiver peripheral devices (AP, WAP), notebook computers, projectors, amplifiers, copy machines, and/or other computer peripheral devices. Thus, an external wakeup signal can be transmitted through an external network via a virtual server to wake up any of the storage tablet PCs 5 for downloading educational software programs, multimedia teaching materials or any other software programs from the Internet onto the storage tablet PCs 5 or updating educational software programs, multimedia teaching materials or any other software programs in the storage tablet PCs 5. Thus, the invention facilitates management of storage tablet PCs 5 in the tablet storage and charging cart, allowing downloading educational software programs, multimedia teaching materials or any other software programs from the Internet onto the storage tablet PCs 5 or updating educational software programs, multimedia teaching materials or any other software programs in the storage tablet PCs 5 without taking the storage tablet PCs 5 out of the mobile cabinet 1.

Further, when holding an online education or meeting, the storage tablet PCs 5 can be taken out of the mobile cabinet 1 for use by each participated individual. When the tablet PCs 5 are started up, they can be connected to the Internet via the external electronic devices 6 in a wired or wireless manner for synchronous online learning or live video meeting, or for use as an electronic whiteboard. When each participated individual is using the respective tablet PC 5 for online education or meeting, he or she can update a software program in real time.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A tablet storage and charging cart, comprising:
a mobile cabinet, said mobile cabinet comprising a horizontal base frame, two opposing upright frames upwardly extended from said horizontal base frame, at least one horizontal partition panel inserted in between said two upright frames and defining with said upright frames a plurality of storage compartments, a storage box set in each said storage compartment, and a plurality of tablet racks set in each said storage box for holding one respective tablet computer each of said plurality of table racks including two symmetrical rack panels, and a plurality of hinges joining said two rack panels; and
a transmission control system mounted in said mobile cabinet, said transmission control system comprising a power management device electrically connectable to an external power source for power input and at least one connector module electrically coupled with said power management device, each said connector module comprising a plurality of USB sockets and a plurality of transmission cables respectively electrically connected to said USB sockets and adapted for electrically connecting said USB sockets to storage tablet computers in said tablet racks.

2. The tablet storage and charging cart as claimed in claim 1, wherein said mobile cabinet further comprises at least one back plate respectively attached to a back side of each said horizontal partition panel and adapted to hold said at least one connector module, said at least one back plate defining with one said upright frame an accommodation space for accommodating said power management device of said transmission control system.

3. The tablet storage and charging cart as claimed in claim 1, wherein said mobile cabinet further comprises at least one back plate respectively attached to a back side of each said horizontal partition panel; said at least one connector module is mounted at an inner side of said at least one back plate; said transmission cables of said at least one connector module are respectively inserted through said at least one back plate, each comprising a first plug located on one end thereof and electrically connected to one said USB socket and a second plug located on an opposite end thereof for connection to a mating port of a tablet computer being stored in one said tablet rack.

4. The tablet storage and charging cart as claimed in claim 3, wherein each said back plate comprises a plurality of cable brackets arranged in a line at a back side thereof for securing the transmission cables of said at least one connector module.

5. The tablet storage and charging cart as claimed in claim 1, wherein said mobile cabinet further comprises a top cover located on a top side of said upright frames, a plurality of front door panels bilaterally coupled to one said upright frame and biasable relative to the respective upright frame within 90-degrees angle between a close position and an open position, a front door lock adapted for locking said front door panels in the close position, a plurality of rear door panels respectively hinged to the other said upright frame, and a rear door lock adapted for locking said rear door panels in the close position.

6. The tablet storage and charging cart as claimed in claim 5, wherein said mobile cabinet further comprises two opposite lateral sliding spaces defined within said upright frames, and a plurality of guide rails symmetrically and fixedly mounted in said two opposite lateral sliding spaces at different elevations, each said guide rail having a coupling end portion respectively coupled to said front door panels in such a manner that when said front door panels are biased relative to said upright frames through 90-degrees angle from the close position to the open position, said front door panels are movable along said guide rails toward the inside of said mobile cabinet and respectively receivable in said lateral sliding spaces inside said mobile cabinet.

7. The tablet storage and charging cart as claimed in claim 1, wherein said mobile cabinet further comprises a plurality of casters mounted to a bottom wall of said horizontal base frame to facilitate movement, two side covers mounted to said upright frames at two opposite lateral sides and respectively equipped with a respective handle, and a fan module mounted at each said side cover and electrically coupled with said power management device of said transmission control system.

8. The tablet storage and charging cart as claimed in claim 1, wherein each said storage box comprises a box body, said box body comprising a plurality of locating grooves therein for receiving an external protruding part of the hinges of each said tablet rack being set in said box body; each said tablet rack further comprises a plurality of retaining spring plates located on an inside wall of each of the rack panels thereof for holding down one storage tablet computer therein.

9. The tablet storage and charging cart as claimed in claim 8, wherein each said tablet rack further comprises a plurality of male fastening elements located on one rack panel thereof, and a plurality of female fastening elements located on the other rack panel thereof for receiving said male fastening elements.

10. The tablet storage and charging cart as claimed in claim 1, wherein said mobile cabinet further comprises a top cover located on a top side of said upright frames; said transmission control system further comprises an expansion connector module mounted at said top cover and electrically connected to said power management device and said at least one connector module.

11. The tablet storage and charging cart as claimed in claim 1, wherein said transmission control system further comprises an expansion connector module electrically connected to said power management device and said at least one connector module, said expansion connector module comprising a plurality of electrical signal connectors and a plurality of power sockets for the connection of external electronic devices for communication with tablet computers being stored in said tablet racks.

12. The tablet storage and charging cart as claimed in claim 1, wherein said transmission control system further comprises a display unit electrically connected to said power management device and said at least one connector module, said display unit comprising a plurality of light-emitting devices controllable to give off different colors of light and/or flashing modes, indicating connection and charging saturation status of the respective tablet computers being stored in said tablet racks.

* * * * *